April 5, 1966   C. A. BARNEY ETAL   3,245,031
BUS BAR MOUNTING CLIP
Original Filed Nov. 2, 1962

_United States Patent Office_

3,245,031
Patented Apr. 5, 1966

3,245,031
BUS BAR MOUNTING CLIP
Charles A. Barney, Stow, and John Collins, Framingham, Mass., assignors to Ark-Les Switch Corporation, Watertown, Mass., a corporation of Massachusetts
Continuation of application Ser. No. 235,031, Nov. 2, 1962. This application Sept. 3, 1964, Ser. No. 394,226
4 Claims. (Cl. 339—258)

This invention is a continuation of our application Serial No. 235,031 filed November 2, 1962, and now abandoned and relates to an electrical connector using pressure and friction, such connectors being used as clips for mounting bus bars and for connecting terminals of electrical devices thereto. More particularly this clip is adapted for the mounting of cylindrical or round bus bars, rods, or wires, either solid or hollow, and is particularly useful with a series of switches or such electrical devices which must be connected by or to such bus bars, the clip being attached to a terminal of the switch or device and further providing a friction contact element extending at an angle to the bus bar for making electrical connection to terminals of other wires or devices by means of an opposite matching cooperating friction contact element. Such clips thereby serve to connect lead wires to and from appropriate bus bars and to connect bus bars to and from electrically operated accessories or devices.

One object of the invention is to provide a clip of the type described above which is simple and economical to manufacture and which is useful in making connections to and from round bus bars without the use of tools. Another object is to provide in such a clip a high contact pressure over a comparatively large surface area so that the frictional pressure contact interfaces of the bus bar and clip exhibit a low resistance to current flow and the joint does not heat unduly. A further object is to provide a bus bar connection clip which strongly resists removal of the bus bar or rod therefrom in a transverse direction when once applied but which permits longitudinal and rotary adjustment of the rod with respect to the clip. A still further object is to provide a bus bar clip carrying an extending friction contact reinforced against misalignment after connection of a bus bar thereto.

Other objects, advantages and details of that which is believed to be novel and included in this invention will be clear from the following description and claims taken with the accompanying drawing in which are illustrated two examples of bus bar mounting clips embodying the present invention.

Figures 1, 2:
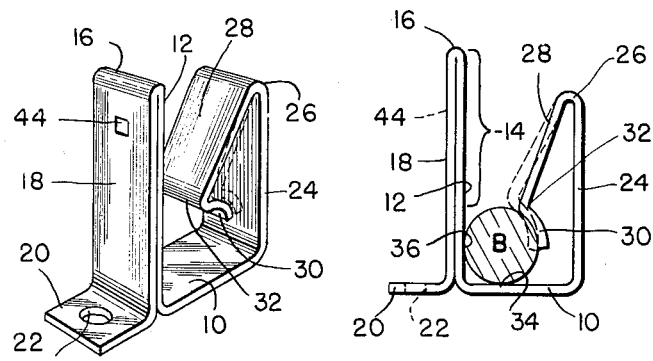
Figure 3:
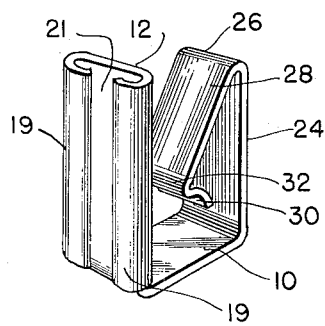
Figure 4:
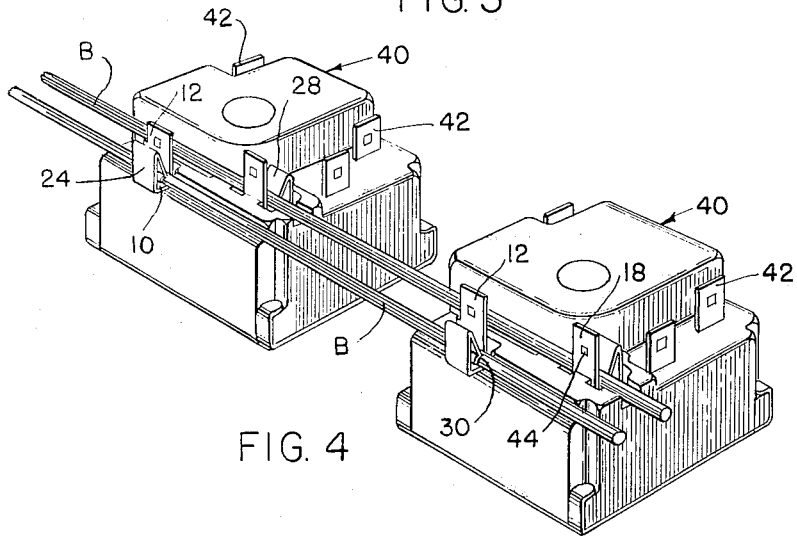

In the drawings:
FIG. 1 is an enlarged perspective view of an exemplary clip shown apart from a bus bar and other elements to which it might be connected;
FIG. 2 is a side elevational view of the clip of FIG. 1 showing how a cylindrical bus bar is held therein;
FIG. 3 is an enlarged perspective view like FIG. 1 but showing a modified form of clip according to the invention, and
FIG. 4 is a perspective view on a smaller scale showing a pair of switches or other electrical devices provided with clips according to this invention, with round bus bars or rods secured in the clips to connect terminals of the electrical devices to each other.

In carrying out the objects of this invention, in a preferred embodiment thereof the clip is made from a relatively thin flat sheet or strip of resilient conductive metal, such as phosphor bronze, blanked or pierced into a single piece which is thereafter bent up or similarly formed into proper final shape. The single piece from which the clip is fabricated is generally elongated, that is, its length is considerably greater than its width, and a portion of the piece near the center will be left flat so as to function as a planar wall or base 10 for the clip.

At one end of the base the piece is bent at a right angle to form a contact arm portion 12 projecting sufficiently away from or beyond the base wall so that a free connector contact area 14 is provided beyond the diameter of a bus bar or rod B for which the particular clip is designed. Because the flat arm 12 and its contact area 14 are intended to serve as parts of a frictional contact stab element extending at right angles to the axis of the bus bar in a plane parallel to the bar and cooperating with a removable friction connector element or terminal socket, the extended outer end of the arm 12 is bent or folded back upon itself as at 16 and a reinforcing or stiffening element portion 18 is provided, backing up the arm 12, this stiffening element portion materially reducing the normal flexibility and resiliency of the projecting stab portion of the clip. Because of the stiffening thus provided, the arm 12 will not be bent out of proper position when a bus bar is inserted in the clip.

At the end of the portion 18 near the base 10 a projecting clip mounting or connection tab 20 may be formed as shown, provided with a mounting hole 22 for the reception of a screw, rivet, or similar clip-holding element in a manner and for purposes readily understood. If desired, the base portion 10 itself might be provided with such a mounting hole, if located in a place such that the clip-holding element used therein does not interfere with proper contact of a bus bar within the clip and against the base portion and the contact arm.

Opposite the stiffened contact arm and at the other end of the base portion, the resilient metal strip is bent at a right angle to the base to form a spring arm portion 24 generally parallel to and opposite the arm 12, this arm also projecting from the base substantially beyond the diameter of a rod which is to be held in the clip. At the upper end of this spring arm the piece is bent downwardly again or back toward the base portion and toward the contact arm as at 26, this bend being made, as shown, preferably at an angle of about twenty degrees with respect to the arm 24 and facing arm 12 at a low angle to form a second spring arm portion 28 ending in an arcuate contact wall portion 30 above the base, of a curvature matching a segment of the circumference of a rod to be held in the clip. The concave curved wall faces both the base 10 and contact arm 12, or the junction between base 10 and arm 12. Before a bus bar or rod B is connected to the clip, as shown in FIG. 2 the slanted spring arm 28 will be in the position shown in dotted lines. As a bar is forced into the V-opening between the contact arm 12 and the facing slanted spring arm 28 it forces the spring arms 24 and 28 to flex until the bar passes below the bend 32 between the arm 28 and the arcuate wall 30. The lower free end of curved contact wall 30 being further from wall 12 than the bend 32, as the bar passes the bend the spring arm 28 and the first spring arm 24 force and snap the arcuate wall 30 resiliently into contact with the bus bar, pressing the bar into line contact with the base 10 as at 34 and into line contact with the arm 12 as at 36.

The material of the clip is so selected and the dimensions of the various portions of the clip are so designed that an extremely high contact pressure is maintained between the clip and a cylindrical bar of a diameter for which the clip is designed. The stiffening of arm 12 prevents its being forced out of line when a bus bar is forced into the clip. As should be obvious from the above description, the bus bar has three contact areas with the clip, the line contact 34, the line contact 36, and the arcuate contact surface area of the curved wall 30. This multiplicity of contact positions, spaced around the bus bar, under high pressure according to properly selected materials and dimensions, insures that the interfaces between the bus bar and the clip will not heat unduly there being the minimum of resistance to current flow with such conditions.

Note also that the arcuate contact wall 30 faces and engages the circumference of a bus bar in the clip at points above or beyond the level of the line contact 36 and outside of the line contact 34 so that the bar is always pressed not only sidewise against the line 36 but also inwardly against the line 34 on the base. This positioning of the parts means that although the bar may be introduced into the clip relatively easily in a transverse direction because of the low slope of arm 28 relative to arm 12, it is difficult to remove the bar in the reverse direction, this being resisted by the high angle of the contact wall 30 and engagement of the bend 32 above or beyond an imaginary line passing through the contact line 36 parallel to the plane of the base 10. However, there is nothing excepting friction and spring pressure between the bar and the clip to prevent relative shifting between the bar and the clip in a direction axially or rotationally of the bar. Thus, even after a round bar is fully engaged in the clip, adjustment of the bar and the clip relative to each other may be made in the axial direction or by rotating. Such adjustments facilitate the final mounting of devices carrying the bus bar clips even after bars are connected to the clips.

The form of the invention illustrated in FIG. 3 contains all of the essential elements described above in connection with FIG. 1, including the base portion 10, the stiffened contact arm portion 12, the spring arm portions 24 and 28, and the arcuate contact wall portion 30. However, whereas the stiffened contact arm 12 in FIG. 1 is intended as a male stab or friction contact blade for cooperation with a matching female receptacle or socket, the form of FIG. 3 provides the contact arm 12 with formations to produce a female receptacle or friction contact socket at a right angle to the axis of the bar with surfaces for making removable electrical connection to an opposite matching contact blade or stab in a plane parallel to the length of the bar. This is done by extending the side edges of the contact arm 12 in FIG. 3, bending or folding these integral side wings 19 back toward arm 12 to form between them and the arm a socket 21 with internal surfaces adapted for the reception of a cooperating male stab or friction contact blade which might be secured to the end of a wire, connector, or electrical accessory or device. In this form of the invention as in the form of FIG. 1 a clip mounting or connection tab (not shown) may be provided by an integral extension from an end of one or both of the folded over side wings 19 or otherwise on the stiffened contact arm 12. As described above, and if desired, the form of clip in FIG. 3 might be provided with a mounting hole in the base. The folded side wings 19, like the folded reinforcing element portion 18 of the first form, serve to stiffen or reinforce the contact arm 12 so that its inner surface will furnish a stable area for a line contact 36 between the clip and an inserted bus bar, and so that the arm may function as a part of a frictional contact element without being forced out of line.

One manner of use of clips according to this invention is illustrated in FIG. 4 in which switches or other electrical devices or appliances 40 are provided with male connector members or tongues 42 which project therefrom and form electrical terminals. Certain of these terminals are intended to be connected to bus bars B common to several switches, and these terminals are provided with clips according to this invention, each including a relatively rigid contact arm 12, spring arms 24 and 28 and contact wall 30. The base 10 of each clip is connected mechanically and electrically either through a mounting tab 20 or by other means to electrical terminals or elements in the switch as should be clear from the preceding description. The contact arms 12 may be connected removably to cooperating frictionally engageable contact elements on the ends of lead wires or in fixed receptacles as desired so that a wide selection or choice of possible connections of the switch terminals to various bus bars and circuits or appliances is possible. When the contact arms 12 are in the form of male stab or blade elements as shown in FIGS. 1, 2 and 4, they may be provided if desired with dimples or depressions 44 for engagement with corresponding projecting bosses in cooperating friction contact receptacles or sockets in a manner known to the art.

As will be evident from the foregoing description, certain aspects of this invention are not limited to the particular details set forth as examples, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. A resilient metal mounting clip for a cylindrical bus bar of a given diameter providing a friction contact element extending from said bar comprising,
   a central base wall portion,
   a friction contact arm on one end of said base, at an angle thereto, extending away from the base substantially beyond the given diameter of a bus bar to be received in the clip,
   a first spring arm portion integral with the other end of said base, bent at an angle thereto, extending away from the base opposite said contact arm,
   a second spring arm portion at the end of said first spring arm portion bent at an acute angle thereto, extending in a direction back toward said base and slanted toward said contact arm, and
   an arcuate contact wall portion at the end of said second spring arm, said arcuate wall being of a curvature matching a segment of the circumference of a bus bar to be received in the clip.

2. A mounting clip for a cylindrical bus bar of a given diameter providing a friction contact element extending from said bar comprising,
   a single elongated strip of resilient metal formed into a central planar base wall portion,
   a contact arm portion integral with one end of said base, bent at an angle thereto, extending away from the base substantially beyond the given diameter of a bus bar to be received in the clip,
   a reinforcing portion extending integrally from said contact arm, folded back toward the arm to stiffen said arm and complete a friction contact element on the clip,
   a first spring arm portion integral with the other end of said base, bent at an angle thereto, extending away from the base opposite said reinforced contact arm,
   a second spring arm portion at the end of said first spring arm portion bent at an acute angle thereto, extending in a direction back toward said base and slanted toward said contact arm, and
   an arcuate contact wall portion at the end of said second spring arm, said arcuate wall being of a curvature matching a segment of the circumference of a bus bar to be received in the clip.

3. A clip for mounting a cylindrical bus bar of a given diameter and for providing a friction contact stab extending at a right angle to the axis of said bar comprising,
   a single elongated strip of resilient metal formed into a central planar base wall portion,
   a contact arm portion integral with one end of said base, bent at a right angle thereto, extending substantially beyond the given diameter of a bus bar to be received in the clip,
   a portion extending integrally from the end of said contact arm, folded back against the arm to reinforce and stiffen said arm and complete a friction contact stab on the clip, a first spring arm portion integral with the other end of said base, bent at a right angle thereto, extending opposite said reinforced contact arm beyond the given diameter of a bus bar to be received in the clip, a second spring arm portion at the end of said first spring arm portion bent at an angle of the order of twenty degrees thereto, extending in a direction back toward said base and said contact arm, and a curved concave wall portion at the end of said second spring arm, said curved wall facing the junction between said base wall and said contact arm portions and being of a curvature to engage a bus bar to be received in the clip, whereby said spring arms are adapted resiliently to press said curved wall against a bus bar in the clip and urge the bus bar against both said contact arm and base wall.

4. A resilient metal clip for mounting a cylindrical bus bar of a given diameter and for providing a friction contact stab extending at a right angle to the axis of said bar comprising, a central planar base wall portion, a friction contact arm on one end of said base, at a right angle thereto, extending substantially beyond the given diameter of a bus bar to be received in the clip, a first spring arm portion integral with the other end of said base, bent at a right angle thereto, extending opposite said contact arm beyond the given diameter of a bus bar to be received in the clip, a second spring arm portion at the end of said first spring arm bent an an angle of the order of about twenty degrees thereto, extending in a direction back toward said base and said contact arm, and a curved concave wall portion at the end of said second spring arm portion, said curved wall facing the junction between said base wall and said contact arm portions and being of a curvature to engage a bus bar to be received in the clip, whereby said spring arm is adapted resiliently to press said curved wall against a bus bar in the clip and urge the bus bar against both said contact arm and base wall.

References Cited by the Examiner

UNITED STATES PATENTS

| 783,061 | 2/1905 | Mills | 339—257 |
|---|---|---|---|
| 2,391,428 | 12/1945 | Link | 339—258 X |
| 3,003,132 | 10/1961 | Johnson et al. | 339—258 |

JOSEPH D. SEERS, *Primary Examiner.*

J. H. McGLYNN, *Assistant Examiner.*